United States Patent [19]
Jensen

[11] Patent Number: 5,136,986
[45] Date of Patent: Aug. 11, 1992

[54] DUAL FUEL INJECTION STRUCTURE

[75] Inventor: Scott P. Jensen, Tacoma, Wash.

[73] Assignee: Energy Conversions, Inc., Tacoma, Wash.

[21] Appl. No.: 692,145

[22] Filed: Apr. 26, 1991

[51] Int. Cl.⁵ .......................................... F02B 77/00
[52] U.S. Cl. .............................. 123/27 GE; 123/527; 123/198 D
[58] Field of Search ............. 123/27 GE, 575, 198 D, 123/198 DB, 359, 527

[56] References Cited

U.S. PATENT DOCUMENTS

| | | | |
|---|---|---|---|
| 1,962,283 | 6/1934 | Nordberg | 123/32 |
| 2,635,589 | 4/1947 | Klinger | 123/27 |
| 2,696,807 | 12/1954 | Junge | 123/27 GE |
| 4,176,651 | 12/1979 | Backus | 123/27 GE |
| 4,430,978 | 2/1984 | Lewis | 123/527 |
| 4,463,734 | 8/1984 | Akeroyd | 123/525 |
| 4,499,885 | 2/1985 | Weissenbach | 123/27 GE |
| 4,537,172 | 8/1985 | Kanehara | 123/527 |
| 4,570,578 | 2/1986 | Peschka | 123/27 GE |
| 4,597,364 | 7/1986 | Young | 123/27 GE |
| 4,612,881 | 9/1986 | Tsjumura et al. | 123/27 |
| 4,619,240 | 10/1986 | Bedford et al. | 123/575 |
| 4,637,353 | 1/1987 | Codrington | 123/27 |
| 4,696,278 | 9/1987 | Ito | 123/527 |
| 4,704,997 | 11/1987 | Endo | 123/27 GE |
| 4,865,001 | 9/1989 | Jensen | 123/525 |
| 4,909,209 | 3/1990 | Takahashi | 123/527 |
| 5,025,758 | 6/1991 | Djurdjevic | 123/527 |

FOREIGN PATENT DOCUMENTS 0184937  9/1985  Japan .............................. 123/27 GE

*Primary Examiner*—Carl S. Miller
*Attorney, Agent, or Firm*—Leo Gregory

[57] ABSTRACT

A fuel injection structure for dual fueled combustion engines having access to the combustion chamber of a cylinder to automatically supplement a liquid fuel with a gaseous fuel, the structure being adapted to supply the gaseous fuel by a programmed electronic control circuit which regulates the operation of fuel injection to be in accord with certain sensed engine operation parameters to determine from said parameters a desired gaseous fuel flow rate and a signal responsive to said parameters actuating a valve to control said flow.

9 Claims, 4 Drawing Sheets

DUAL FUEL INJECTION STRUCTURE

BACKGROUND OF THE INVENTION

1. Field of Invention

The mixture of a gaseous fuel with a liquid fuel in the operation of an internal combustion engine.

2. Brief Description Of The Previous Art

The use of a mixture of a liquid fuel such as diesel fuel with a gaseous fuel such as natural gas in connection with an internal combustion engine is practiced to benefit from economy in fuel consumption and from a cleaner and more efficient operation of the engine.

A particular problem is present in the application of a mixture of a liquid and a gaseous fuel to an internal combustion engine and that problem is present in the escape of gaseous fuel with the discharge of scavenging air.

Improvement is required in timing the introduction of the gaseous fuel with regard to certain operation parameters of the engine to avoid the escape of gaseous fuel.

Further a problem is present in the effort to avoid a build up of carbon deposits, heat and pressure in a gaseous fuel inlet valve which does not have an independent operation.

SUMMARY OF THE INVENTION

Provided herein is a gaseous fuel inlet valve structure for use in connection with an internal combustion engine to combine a gaseous fuel with a liquid fuel such as diesel oil. The mixture results in a cleaner and more efficiently burning fuel.

The structure herein provides for a direct gaseous fuel injection into the combustion chamber of a cylinder controlled by an electronic triggered pneumatic operation in which the valve timing is nicely arranged so that no gaseous fuel escapes with scavenging air through open exhaust valves.

Also provided for herein is the addition of a gaseous fuel to a liquid oil fuel independently of the otherwise operation of the engine.

Further, it is provided herein to arrange the timing for introduction of a gaseous fuel in a manner to eliminate a build up of carbon and oil in the inlet valve when the engine is running in a single fuel mode.

Provision is also made herein to effect a conversion of a two cycle internal combustion engine from a liquid fuel to a dual fuel operation with fewer hardware changes than would otherwise be required.

It is also an object herein to provide a programmed control to introduce a gaseous fuel for mixture with a liquid fuel at an optimum time resulting from said control sensing certain parameters of an engine operation and the crankshaft position to avoid the induction of the gaseous fuel during the time when scavenging air is being discharged.

These and other objects and advantages will be set forth in the following description made in connection with the accompanying drawings in which like reference characters refer to similar parts throughout the several views.

BRIEF DESCRIPTION OF THE DRAWINGS

FIG. 2a is a view in vertical section showing the basic structure of the safety switch 56a of FIG. 2;

DESCRIPTION OF A PREFERRED EMBODIMENT

The invention herein comprising a gaseous fuel inlet valve in connection with a diesel fueled engine is constructed and arranged to introduce gaseous fuel directly into the combustion chamber of a diesel cylinder. The valve structure is particularly designed to convert a diesel engine to operate either in a diesel fuel mode or in a dual fuel mode with the admixture of the gaseous fuel with fewer hardware changes than would otherwise be required to make the conversion. Diesel fuel as used herein is intended to represent all appropriate liquid fuels and the word diesel as used herein is intended to mean a liquid fuel in a generic sense.

Figure 1:
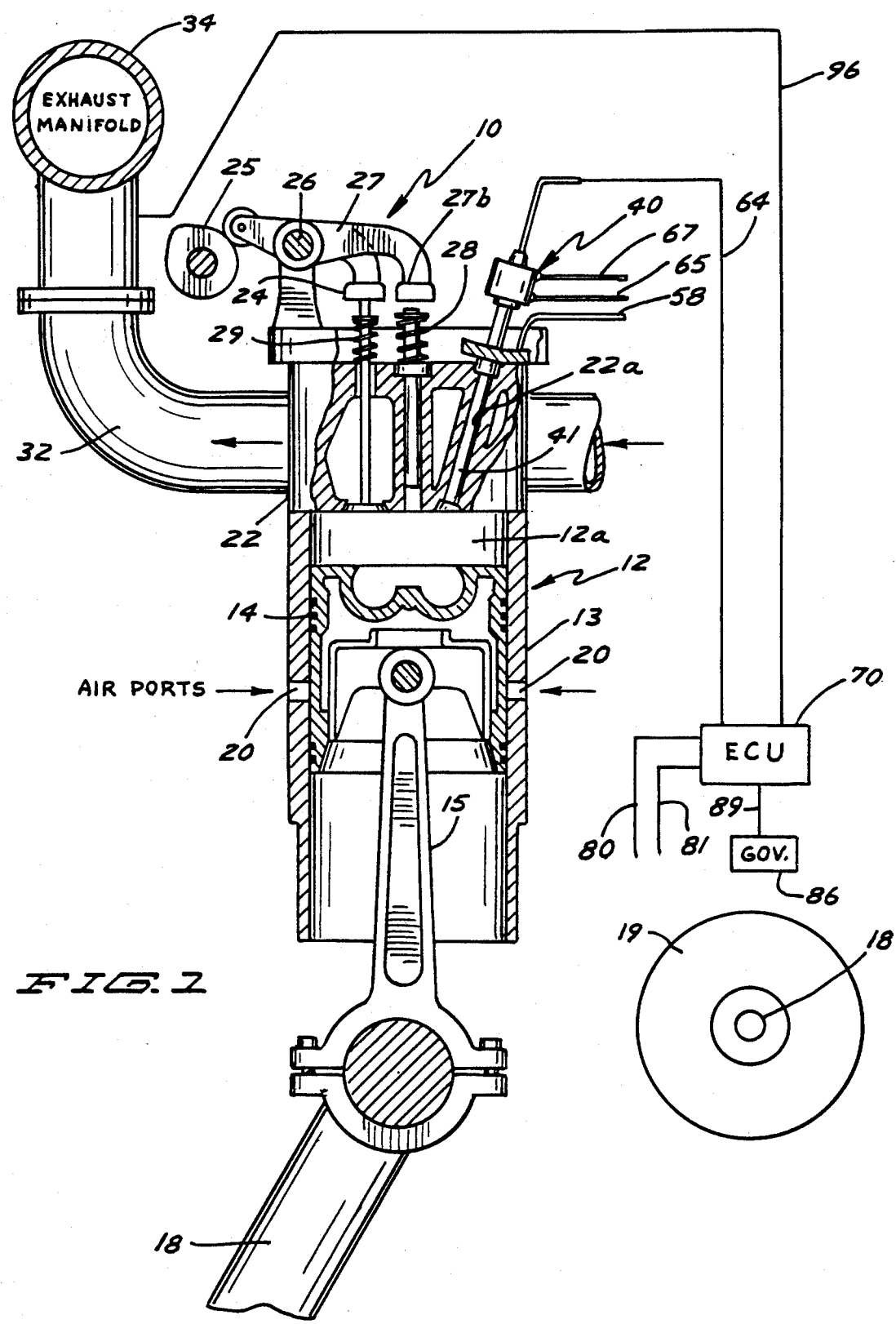
FIG. 1 is a view of a cylinder for the most part in vertical section and some related parts being shown schematically.

Referring to the drawings and particularly to FIG. 1., the structure indicated by the reference numeral 10 illustrates a cylinder structure 12 having installed therein a valve 40 which comprises the invention herein and is representative of other cylinders.

Cylinder 12 as shown is a typical or conventional cylinder for a diesel fueled engine and consists of a cylinder block 13 having therein a piston 14 operating a connecting rod 15 which in turn is connected with a crankshaft 18. Air ports 20 are indicated in the cylinder block. A fly wheel is at 19.

Mounted on top of said cylinder is a cylinder head 22. With regard to the intake of a liquid fuel, such as diesel, said cylinder head is fitted with a conventional shaft mounted cam 25 which operates a rocker arm 27 mounted onto a shaft 26 and said rocker arm in turn by means of a shoe 27b thereon operates a fuel injector 28. Also mounted onto said shaft 26, though not here shown, is a rocker arm, the shoe of which is indicated at 24 which sequentially operates an exhaust valve 29 which discharges through an exhaust passage 32 and this passage in turn exhausts through an exhaust manifold 34. Included within the concept herein, through not shown, are a plurality of exhaust valves sequentially operated with respect to the operation of said injector 28.

Said cylinder block has therein a combustion chamber 12a.

An inlet valve 40 comprising the inventive structure is mounted upon the head of each cylinder, as the one herein described, in connection with a two cycle engine. A later reference will be made to a four cycle engine.

The cylinder head is modified to provide a passage 22a which opens into the combustion chamber 12a and the valve housing or body 41 of said valve 40 will be disposed into said passage in communication with said combustion chamber and will be suitably secured therein.

As will be indicated, the structure herein embodies several improvements over the structure of applicant as disclosed in his prior U.S. Pat. No. 4,865,001 issued Sep. 12, 1989.

Figure 2:
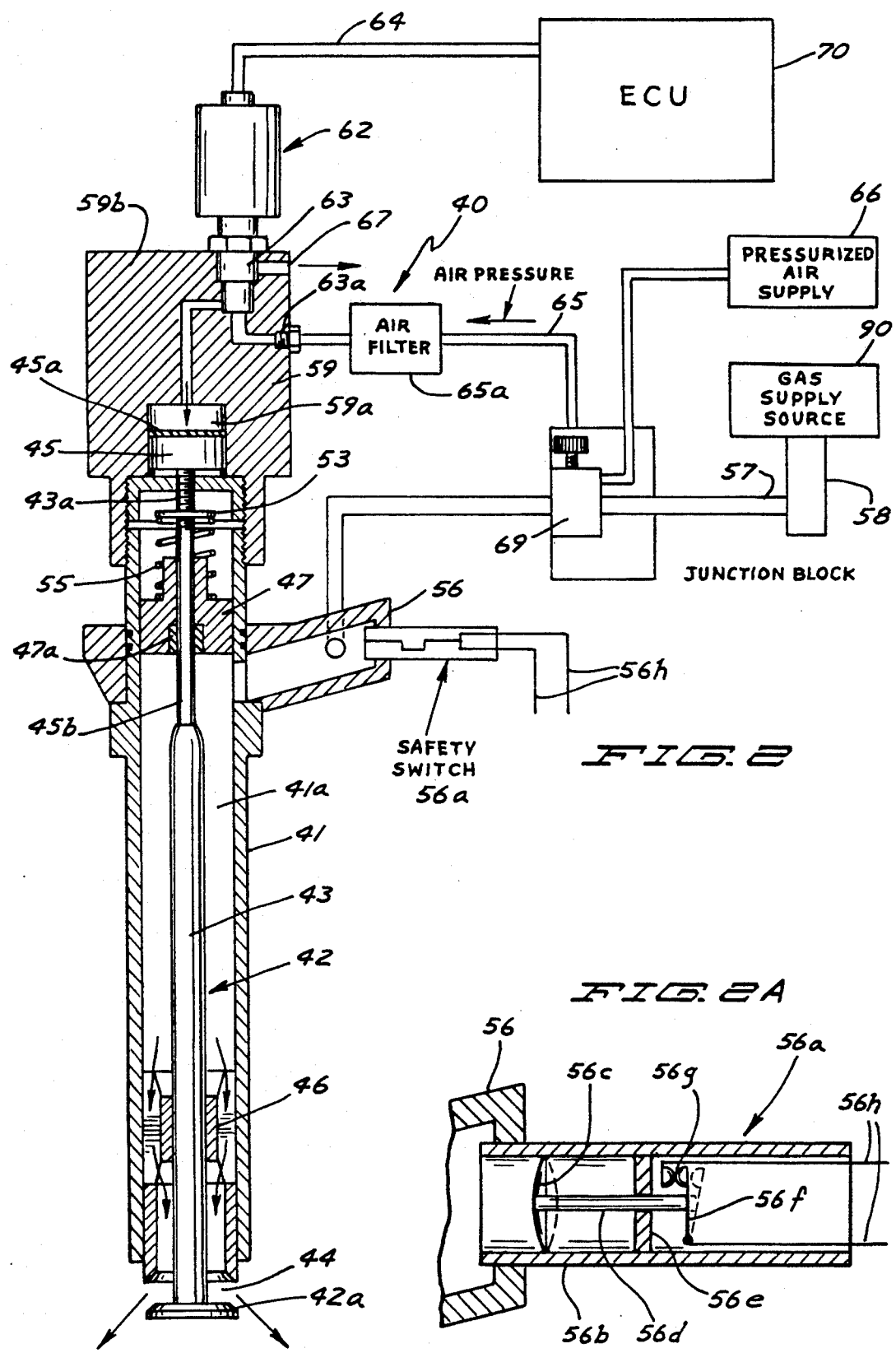
FIG. 2 is a view of valve structure in vertical section showing some additional related parts.

Referring to FIG. 2, said valve 40 is shown in detail and as shown is elongated and substantially tubular in form having therein a passage 41a which opens into said combustion chamber 12a and disposed therein to open or close said passage is a poppet valve 42 having a stem 43, having an upper threaded portion 43a and having threaded thereon a piston 45, said piston being nicely adjustable on said threaded portion of said stem. In connection with said piston is an air seal 45a. Said piston has been increased in diameter over the corresponding structure in said patent to provide a larger area for air to act upon which allows a lower operating air pressure.

The bottom of said valve housing forms a seat or seal 44 for the face portion 42a at the lower end of said valve stem.

Spaced axially within said valve housing are valve guides 46 and 47. The lower guide is fluted to permit gas to flow by.

Said lower valve guide has been redesigned to have a larger cross sectional area for descreased restriction.

Said upper valve guide 47 is formed of a single part for simplification in manufacture.

The material in both valve guides has been changed to require less lubrication.

From a point below said upper valve guide, the lower portion of the valve stem 43 has been increased in diameter for greater strenth. During its operation, the lower portion of said valve stem becomes heated sufficiently to have its tensile strength lowered and its increased diameter is sufficient to avoid breakage. The upper end portion 43b of said valve stem remains smaller due to the tight tolerance of the actuating upper end of said valve stem. Thus said valve stem 43 is improved in having a stepped diameter.

Threaded onto the upper portion of said valve stem is a disc like adjustable spring retainer 53 permitting a fine adjustment of spring pressure to have all valves with appropriate pre-load pressure. Mounted unto said valve stem between the upper valve guide 47 forming its seat and said retainer 53 is a coil compression spring 55 which normally urges said valve stem 43 upwardly into a closed position to seal the passage 41a.

Recessed within said upper valve stem guide to prevent any gaseous fuel from leaking by is a valve stem seal 47a.

Entering said valve body 41 just below the upper valve guide 47 is a gaseous fuel inlet 56 which will be supplied by a line 57 which is connected with a general supply line 58 which in turn is connected with a suitable supply source 90. Said gas line 57 embodies a gas flow or trimming valve 69 for control of gas flow which allows an engine load to be balanced cylinder by cylinder. The line 57 represents each line running from line 58 to a cylinder. In connection with the inlet 56 and integrated therewith as an improvement is a valve temperature safety switch 56a downstream of the gas trimming valve 69 and is described as shown in FIG. 2a, as comprising an inlet 56b extending into said gas inlet 56 of cylinder 12 and said inlet has adjacent its inner end a pre-set temperature sensitive metallic disc 56c which has a thermal distortion at a given temperature to move the push rod 56d which extends between the guides 56e and said rod moves an engaged circuit wire 56f to separate a pair of adjacent contacts 56g and thus open the series circuit 56h. This switch is connected in series with the like switches of the gas inlet valves of all of the cylinders. Upon the successful completion of a circuit through all of the said switches, a solenoid valve, not shown, is energized. This solenoid valve controls the lubricating oil pressure supply (not shown) to existing safety monitoring system equipment (not shown). In the event of a valve leak large enough to allow combustion gas and heat back into the gas stream, the switch 56a will open separating the contacts 56g. and the solenoid valve will become de-energized and cut off the oil pressure to the safety monitoring system and shut down the engine.

Mounted onto the upper end portion of said valve body 41 as by being threaded thereon is a cylinder 59 having said piston 45 working therein within a compression chamber 59a. Extending upwardly of said cylinder 59 is a cap portion or cap 59b integral therewith.

Suitably mounted onto said cap 59b and extending thereinto is a solenoid valve 62 extending to its body portion 63 within said cap, said body portion having an air port 63a therein controlling an air passage or line 65 running through said cap and communicating with said compression chamber 59a. Said air passage is under a constant supply of pressurized air from a conventional suitable air supply source indicated at 66. The body of said solenoid forms an air control valve and has an air vent 67 therefrom venting to the atmosphere to be fully depressurized when at rest. Embodied in said air passage or line 65 is an air filter 65a. This filter is suitably made of scintered bronze which keeps foreign particles from damaging the seat of the solenoid valve 62.

Said solenoid valve is electronically controlled through line 64 by an electronic control unit 70, to be described.

One of the salient features herein is the avoidance of losing gaseous fuel during the time that the scavenging air is being discharged. This is accomplished by timing the action of the inlet valve 40 to the position of the crankshaft 18 relative to the combustion and exhaust cycles of the cylinder 12.

The operation of said valve inlet 40 is controlled and timed by the programmed electronic control unit 70 referred to hereinafter as ECU. The addition of a gaseous fuel in the operation of said valve 40 is fully independent of the otherwise operation of the engine with diesel fuel. This independent operation avoids a build up in said valve 40 of various deposits and pressures while the engine is operating in a single diesel fuel mode. The operator of the vehicle has the option to select a single or dual fuel mode of operation, otherwise the operation is automatically a dual fuel operation. The control of the admission of liquid fuel is not here shown nor described but such a control is well described in U.S. Pat. No. 4,619,240 to T. Y. Bedford, particularly in col. 10, lines 19–49 and is indicated by sensor 92 in FIG. 3 hereof.

Figure 3:
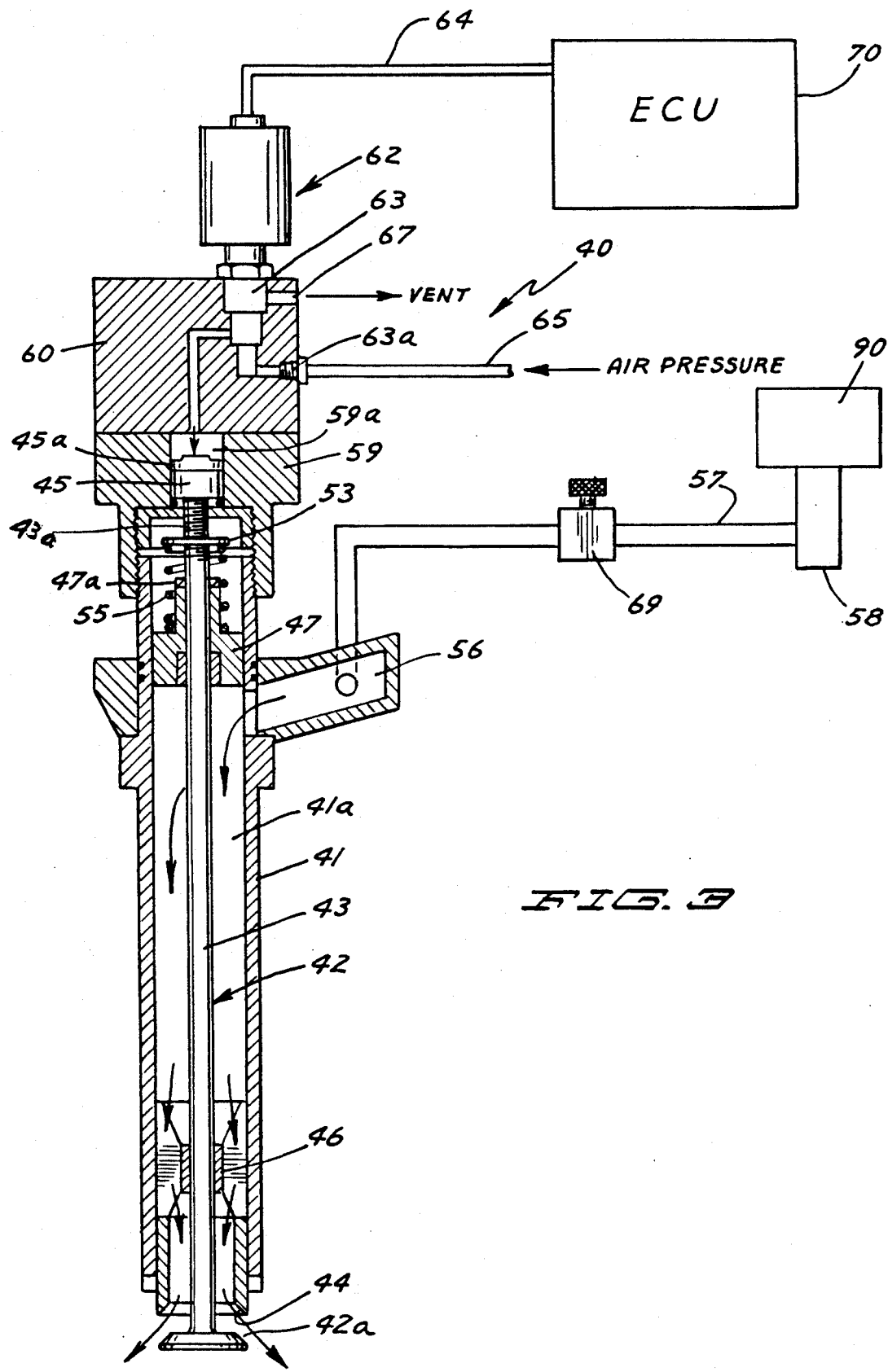
FIG. 3 is a schematic view of a dual fuel arrangement.

Particular reference is now had to the schematic of FIG. 3 in connection with the conversion of a single fuel to a dual fuel mode and the controls for said conversion are shown in the schematic of FIG. 3.

The electronic control unit ECU 70 is programmed to sense various engine operating parameters before energizing the solenoid valve 62 at the optimum time to start the input of gaseous fuel.

The general gaseous fuel supply line 58 has included therein a high pressure regulator 58a, a flow control safety cut off valve 58b and a low pressure regulator valve 58c. These are conventional controls.

Also running from the supply line 58 to said ECU 70 is a gaseous fuel flow sensor line 88 and a gaseous fuel temperature sensor line 89. Said ECU controls the cut back of a liquid fuel through the control line 92 and also, controls the gaseous fuel line 105 which runs to a flow control valve 106. The engine load is sensed by the sensor 88 which references gas flow with engine speed.

The speed of the engine is sensed by the flywheel sensor 80 adjacent the flywheel 19. The position of the crankshaft is noted by the sensor 81 scanning conventional position targets or magnets, not shown, on the flywheel. When the crankshaft position indicates that the exhaust valve is just closed, said ECU, with the engine parameter being sensed in appropriate condition, energizes the solenoid 62 of each cylinder and the injector of each cylinder comes into operation.

Thus it is seen that said ECU has the exercise of control over lines 92 and 105 and of the operation of the inlet valves 40.

From the general gaseous fuel line 58 which embodies the flow control valve 106, fuel is supplied to the individual cylinders by means of line 57. Liquid fuel is merely indicated at 107 (FIG. 3) and the passage thereof to the individual cylinders is controlled by means of line 92. The details of this control are not germane to the invention herein.

It is to be understood that specific programmed software instructions are established for each engine as to the optimum conditions for use of a dual or mixed fuel and upon such conditions being sensed, the solenoid 62 is energized.

Said solenoid 62 upon being energized opens its port 63a to have pressurized air flow into the compression chamber 59a and said air bears upon the piston 45 forcing it downward to compress the spring 55 and open the passage 41a. Gaseous fuel is then free to flow through said passage 41a into the combustion chamber 12a.

Thus it is seen that the injector valve 62 is electrically triggered to cause the valve 42 to be pneumatically actuated.

The gaseous fuel ignites in the combustion chamber 12a with the combustion of the liquid fuel, said gaseous fuel becoming ignited by a pilot fuel injected after the completion of the admission of gaseous fuel. The gaseous fuel is admitted during that part of the compression stroke in said combustion chamber after the exhaust valve is closed and prior to the rapid increase in the compression pressure which follows.

The scavenging air is exhausted in a cycle following combustion process and prior to the next cycle of the entry of gaseous fuel into said combustion chamber. Thus there is no escape of gaseous fuel with the exhaust of scavenging air.

With the entry of gaseous fuel into the combustion chamber said ECU causes the solenoid valve of each cylinder to close the air supply port 63a and open the vent 67 to exhaust the compression chamber 59a allowing the spring 55 to close the valve 40 and stop the gaseous flow, a full cycle has been completed.

Said ECU can be very closely controlled to fit a wide range of applications in being able to be optimized for different RPM levels of various engines. The position of the piston 45 and the tension of the spring 55 may be precisely adjusted individually for optimum performance.

Figure 4:
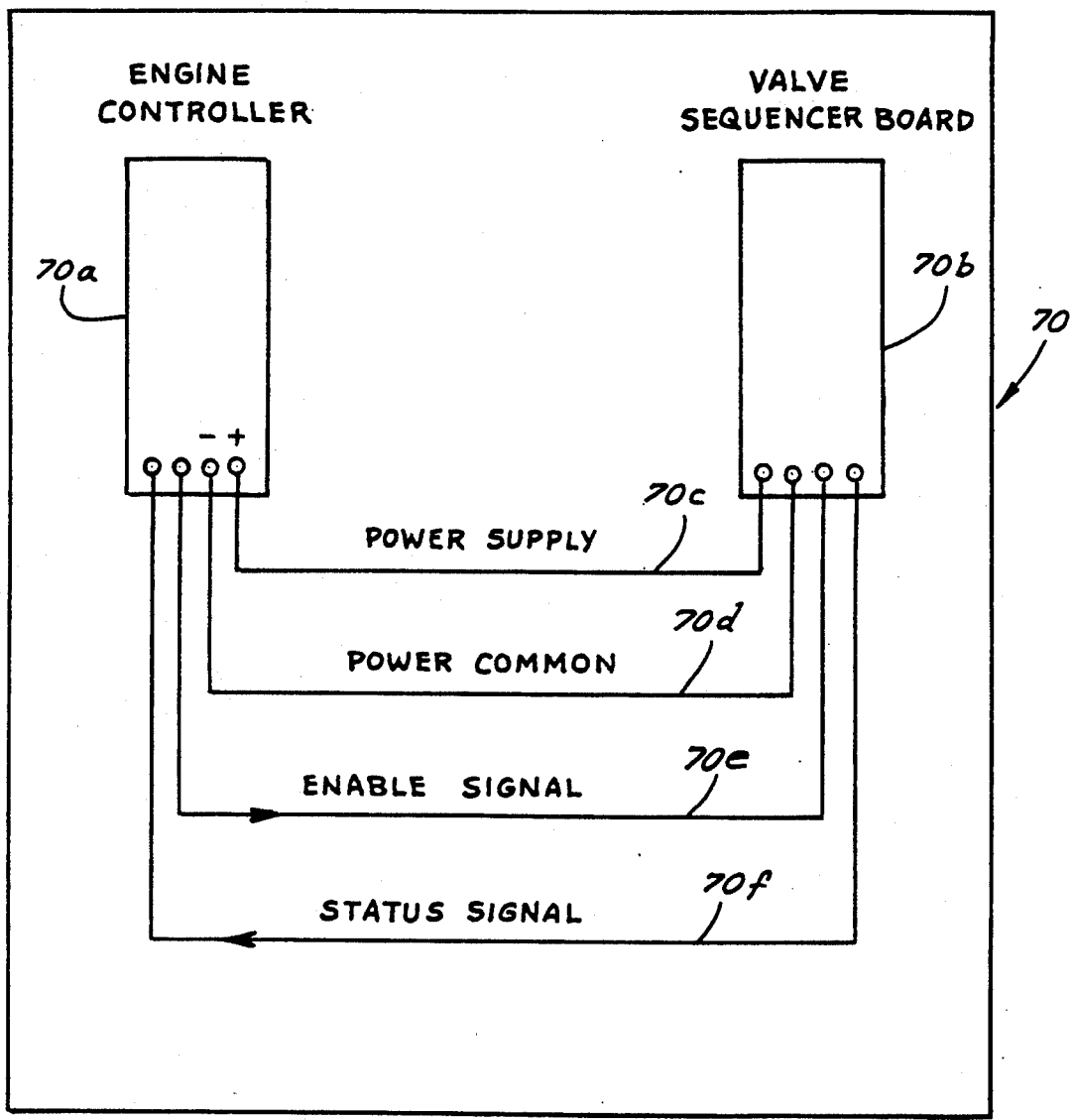
FIG. 4 is a schematic view of the makeup of the control unit.

With reference to the description in connection with FIG. 3, reference is now had to FIG. 4 in which a schematic view is shown of the makeup of the electronic control unit 70.

Embodied in said structure are micro-processors comprising an engine control circuit board 70a and a valve sequencer or gas inlet valve control board 70b.

As indicated said boards are inter-connected with a power supply line 70c and a common or neutral line 70d. Also interconnecting said boards is a line 70e conducting an enabling signal from the engine controls described in connection with FIG. 3 and a line 70f conducting a status signal from the valve sequencer lines described in connection with FIG. 3.

The circuitry of board 70a sends a signal to the valve sequencer board 70b to operate the valves. The valve sequencer board responds by sending a signal to the engine control board that the valves are operating.

The engine control board can signal the valve sequencer board to turn on or off at anytime conditions indicate that it should. The sequencer board will respond with its status signal.

If the valve sequencer board refuses to operate due to an error detected in its input signal through lines 80 and 81, as described in connection with FIG. 3, the status signal will indicate to the engine control circuit board 70a that it cannot operate and the engine control board will automatically return the engine to the diesel mode of operation. This all occurs in such a short span of time that there is no noticeable change in the engine operation.

The above structure has been described in connection with a two-cycle engine. The valve structure may also be used in connection with a four cycle engine. Said inlet valve structure on the basis of one valve per cylinder is inserted into the intake manifold of each cylinder and in this situation the gaseous fuel is introduced after an exhaust valve is closed and during the time that an intake valve is open.

It will of course be understood that various changes may be made in form, details, arrangement and proportions of the product without departing from the scope of the invention which, generally stated, consists in a product capable of carrying out the objects above set forth, in the parts and combination of parts disclosed and defined in the appended claims.

What is claimed is:

1. In an internal combustion engine having in combination therewith a cylinder having a liquid fuel inlet valve, an exhaust valve and a combustion chamber,
   a gaseous fuel inlet valve,
   a gaseous passage through said gaseous fuel inlet valve into said combustion chamber,
   a gaseous fuel line running to said passage,
   means in said passage normally closing the same,
   a programmed electronic control unit sensing the position of said engine's crankshaft during that time of that part of a compression stroke in said cylinder to indicate that said exhaust valve is closed,
   means energized by said electronic control unit upon said electronic control unit sensing a closing of said exhaust valve causing said means in said passage to open said passage into said combustion chamber to admit gaseous fuel therein, and
   a temperature responsive sensing means in connection with said gaseous fuel line downstream of said gaseous fuel inlet valve.

2. An internal combustion engine having in combination a cylinder having a liquid fuel inlet valve, an exhaust valve and a combustion chamber,
   a gaseous fuel inlet valve having a passage communicating with said combustion chamber,
   said cylinder embodying a fuel injector and an exhaust valve, said fuel injector and exhaust valve being sequentially operated by a cam actuated rocker arm, a programmed electronic control unit sensing the appropriate position of the engine crankshaft as to the position of the crankshaft in said combustion chamber of said cylinder to indicate the exhaust valve as closed in order to energize said gaseous inlet valve and open said gaseous passage, and a temperature responsive sensing means in connection with said gaseous fuel inlet valve passage.

3. The structure of claim 1, wherein said temperature sensing means comprising a heat sensitive switch actuated by combustion gas leaking from said combustion chamber into said gaseous fuel line, and said temperature sensing means causing the shut down of said engine.

4. The structure of claim 1, wherein said cylinder comprises a unitary valve cylinder head portion, and said head portion has a scintered filter embodied therein.

5. The structure of claim 1, wherein said cylinder includes a fuel inlet valve having a piston therein, said piston having a guide, and said guide including a spring integral therewith urging said piston into a normally closed position.

6. The structure of claim 1, including means electronically triggering and pneumatically actuating said fuel inlet valve.

7. The structure of claim 1, including means sensing the position of the crankshaft of said engine and communicating the same to said electronic control unit.

8. The structure of claim 1, wherein said cylinder embodies a piston of an enlarged diameter portion permitting a lower than otherwise operating air pressure.

9. The structure of claim 1, wherein said electronic control means comprises engine control means and gas inlet valve control means, means interconnecting said engine control means and said gas inlet valve control means, said engine control means including an enabling signal from said sensed positions of said engine's crankshaft, said inlet valve control means having communication with a gaseous fuel line sensor and a gaseous fuel line temperature sensor, whereby said engine control means and said inlet valve control means intercommunicate their respective operating conditions for use of a dual fuel, and said electronic control means responds accordingly with regard to energizing said gaseous inlet fuel valve.

* * * * *